United States Patent

D'Adamo

[11] Patent Number: 5,752,795
[45] Date of Patent: May 19, 1998

[54] APPARATUS AND METHOD FOR PROTECTING EXPOSED SECTIONS OF A NUT AND BOLT

[76] Inventor: Bruce D'Adamo, One Rose Ter., Chatham, N.J. 07928

[21] Appl. No.: 786,451

[22] Filed: Jan. 21, 1997

[51] Int. Cl.⁶ .................................. A61B 37/14
[52] U.S. Cl. ........................... 411/429; 411/373
[58] Field of Search ............... 411/429–431, 371, 411/373–377

[56] References Cited

U.S. PATENT DOCUMENTS

| 972,140 | 10/1910 | Adam . | |
|---|---|---|---|
| 1,062,039 | 5/1913 | Schimmel | 411/429 |
| 1,254,514 | 1/1918 | Lehmann . | |
| 2,456,234 | 12/1948 | Young . | |
| 2,551,834 | 5/1951 | Ferguson . | |
| 3,457,823 | 7/1969 | Dillon | 411/373 |
| 4,214,505 | 7/1980 | Aimar | 411/373 |
| 4,400,123 | 8/1983 | Dunegan | 411/431 |
| 5,028,093 | 7/1991 | Nason | 411/373 |
| 5,273,384 | 12/1993 | Dunbar | 411/429 |

FOREIGN PATENT DOCUMENTS 2102910  4/1990  Japan ..................... 411/377

Primary Examiner—Flemming Saether
Attorney, Agent, or Firm—LaMorte & Associates

[57] ABSTRACT

A cap device for covering the exposed sections of a nut and bolt assembly and preventing oxidation of those exposed sections. The cap device incudes at structure having a first end that is opened and an opposite second end that is at least partially opened. The cap structure defines a chamber in between the first end and the second end that is sized to receive a nut and a segment of a bolt that extends through the nut. The chamber inside the cap structure is at least partially filled with a viscous material that creates an air impervious seal between the cap structure and the nut and bolt assembly. As the cap structure is advanced over a nut and bolt assembly, the viscous fill material is displaced from the chamber through the second end of the cap structure. Once fully seated, a closure element is used to seal the second end of the cap structure. The presence of the closure element creates a vapor lock type of seal that helps retain the cap structure in place.

11 Claims, 5 Drawing Sheets

APPARATUS AND METHOD FOR PROTECTING EXPOSED SECTIONS OF A NUT AND BOLT

BACKGROUND OF THE INVENTION

1. Field of the Invention

The present invention relates to devices and methods used to protect the exposed regions of a nut and/or bolt from the surrounding environment. More specifically, the present invention relates to a cap device that can be placed over a nut and the exposed threads of a bolt, wherein the cap device isolates the exposed sections of the nut and bolt from the surrounding environment.

2. Description of the Prior Art

The nut and bolt assembly is one of the most common fastening devices used in manufacturing. However, in many applications both the bolt and the nut lay exposed to the surrounding environment. As a result, the nut and bolt assembly may collect dirt, become damaged by impact or chemically react with the surrounding environment. The degradation of a nut and bolt assembly caused by unprotected exposure to a the surrounding environment has many adverse effects. For example, as a nut and bolt assembly oxidize, the strength of the nut and bolt assembly decreases. Furthermore, as a nut and bolt assembly oxidizes, the threads of the bolt become damaged and the nut may become locked into place. In such a circumstance, the nut cannot be removed from the bolt and nut must be cut away from the bolt. In other situations, the head of the bolt may become damaged by oxidation and the bolt itself may bind to a metal object through which the bolt passes. In such a circumstance, the bolt often must be drilled out and the bolt bore retapped.

The prior art is replete with devices that attempt to prevent the oxidation of nut and bolt assemblies. One such prior art technique is to change the material of the nut and bolt to a non-ferrous composition, such as titanium, or a non-corrosive composition such as stainless steel. Although such a material change does reduce oxidation, the change in material significantly adds to the cost of the nut and bolt assembly, thereby making this approach impractical in cost sensitive applications. Furthermore, although the changing of materials in a nut and bolt assembly reduces oxidation, such a change in material does nothing to protect the nut and bolt assembly from collecting dirt or become damaged by an accidental impact.

Another prior art technique used to inhibit oxidation is to coat the exposed portions of an ordinary nut and bolt assembly with protective layer such as paint, plastic or grease. Curable coatings, such as paint and plastic, tend to clog the threads of a bolt, thereby making the removal of a nut more difficult. Furthermore, the application of such coatings is time consuming and labor intensive because the nut and bolt must be cleaned and the coating reapplied every time the nut is tightened or loosened. Non-curable viscous coatings such as grease tend to collect dirt. Furthermore, non-curable viscous coatings tend to wear away over time, thereby leaving the nut and bolt assembly unprotected.

Yet another prior art approach that is used to protect nut and bolt assemblies is to cover the exposed portions of a nut or bolt with a cap device, thereby protecting the nut and/or bolt from oxidation, dirt and physical damage. Such a cap device is exemplified by U.S. Pat. No. 1,254,514 to Lehmann, entitled NUT AND THREAD PROTECTOR. Such prior art cap devices provide a structure that covers the nut and any section of a bolt that extends through the nut. The disadvantages of such prior art caps is that the seal created around the nut and exposed bolt is not perfect. As such, moisture may be able to enter the cap device, wherein the cap device serves to retain the water in contact with the nut and exposed bolt. Consequently, in some applications, such a prior art cap device may actually cause more oxidation in the nut and exposed bolt than would occur if no cap were present.

To prevent this problem, cap devices have been developed where the cap is filled with grease or another non-curable viscous material. Such prior art cap devices are exemplified by U.S. Pat. No. 979,140 to Adam, entitled MEANS FOR PROTECTING BOLTS, NUTS, ETC. In such cap devices, the presence of the grease prevents moisture from entering the cap and contacting the nut and exposed bolt.

A disadvantage associated with both the Adam cap device and the Lehmann cap device is that such prior art cap devices must thread onto the exposed portion of the bolt in order to be held in place. If the bolt in the assembly does not extend past the nut, or only extends a short distance beyond the nut, then such a prior art cap devices can not be used. Furthermore, such cap devices must be manufacture with an internal threading that matches that of the external threading on the exposed bolt. Consequently, no one cap device can be used on bolts of different thread type and/or thread diameter.

A secondary disadvantage also exists in prior art cap devices, such as the Adam cap, that are prefilled with grease. In such cap devices, as the cap device is threaded onto the exposed portion of a bolt, the prefilled grease becomes trapped between the top of the advancing cap and the exposed section of bolt. As the cap device further advances, the grease becomes compressed and the pressure of grease raises above ambient pressure. As a result, even after the cap device is fully seated into place, the pressure of the grease acts to unseat the cap device and unthread the cap device from the top of the exposed bolt.

It is therefore an objective of the present invention to provide a cap device that covers the exposed section of a nut and bolt assembly in a manner that does not permit air or moisture to enter the cap device, yet does not create a high pressure state within the cap device when set into position.

It is a further objective of the present invention to provide a cap device for a nut and bolt assembly that does not have to engage the threads of the exposed bolt in order to be held in place.

These objects are fulfilled by the present invention as described and claimed below.

SUMMARY OF THE INVENTION

The present invention is a cap device for covering the exposed sections of a nut and bolt assembly and preventing oxidation of those exposed sections. The cap device incudes at structure having a first open end and an opposite second end that is at least partially opened. The cap structure defines a chamber in between the first end and the second end that is sized to receive a nut and a segment of a bolt that extends through the nut. The chamber inside the cap structure is at least partially filled with a viscous material. The viscous material creates an air impervious seal between the cap structure and nut and bolt assembly when the cap structure is placed over the nut and bolt assembly. As the cap structure is advanced over a nut and bolt assembly, the excess viscous fill material is partially displaced from the chamber through the second end of the cap structure. Once fully seated, a closure element is used to seal the second end of the cap

3 structure. Once sealed a type of vapor lock type seal is created within the cap structure that helps retain the cap structure in place.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Although the present invention cap device can be used to protect many types of nuts and bolt heads that have different peripheral configurations, the present invention cap device is particularly well adapted for use in protecting common nuts and bolt heads with hexagonal configurations. As a result, the present invention cap device will be described in an application for protecting a common hexagonal nut and bolt assembly in order to set forth the best mode contemplated for the device.

Figure 1:
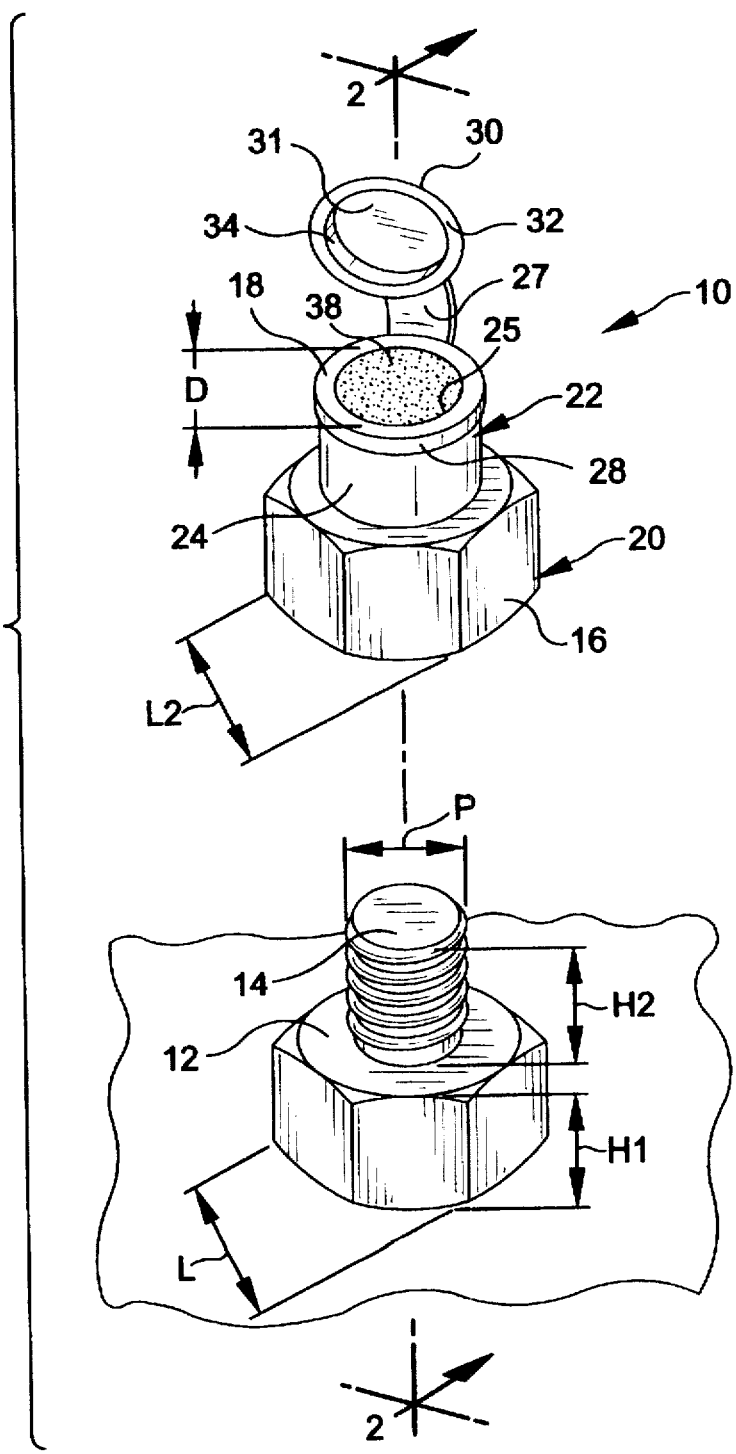
FIG. 1 is a perspective view of a first preferred embodiment of the present invention cap device, shown in conjunction with a nut and bolt.

Referring to FIG. 1, a first preferred embodiment of the present invention cap device 10 is shown. The cap device 10 is shown in conjunction with a nut 12 and a bolt 14 that extends through the nut 12. The purpose of the cap device 10 is to cover the nut 12 and the exposed section of the bolt 14, thereby isolating the nut 12 and bolt from the surrounding environment and preventing the nut 12 and bolt 14 from oxidation, physical damage and/or collecting dirt. The nut 12 can be any commercially available size. However, in most common applications the nut 12 will have a side-to-side length L that is between ¼ inch and 3 inches. The side-to-side length L of the nut 12 corresponds to the size of a wrench used to either tighten of loosen the nut 12. The nut 12 also has a height H1 which is typically less than the side-to-side length L of the nut 12.

The bolt 14 can be any commercially available bolt regardless to its pitch diameter P, or thread size. In the shown application of a nut 12 and a bolt 14, the bolt 14 extends above the nut 12 by a height H2. Although height H2 can be any length, in the majority of applications the height H2 of bolt's over extension will be less than one inch.

Figure 2:
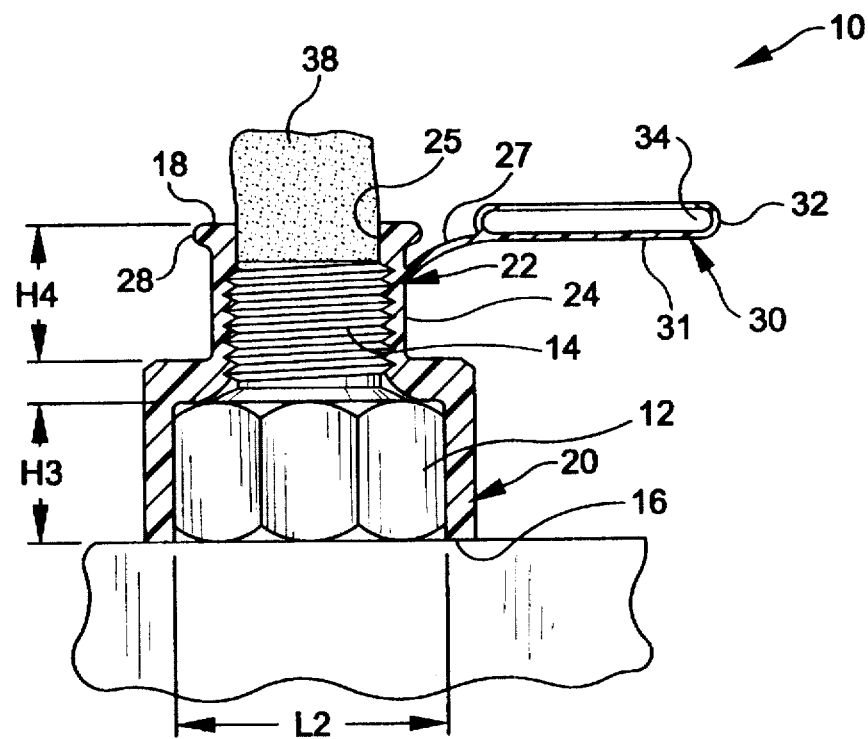
FIG. 2 is a cross-sectional view of the exemplary embodiment of the cap device set forth in FIG. 1, viewed along sectional line 2—2, wherein the cap device is shown in an open condition.

Referring to FIG. 1 in conjunction with FIG. 2, it can be seen that the cap device 10 is a structure having a bottom open end 16 and an opposite top open end 18. The main structure of the cap device 10 is divided into two regions. The first region of the cap device 10 is the nut protecting region 20. The nut protecting region 20 defines a hollow hexagonal shaped chamber that is sized to pass over the nut 12. As such, the nut protecting region 20 has a side-to-side length L2 that is at least as long as the side-to-side length L of the nut 12. Similarly, the interior of the nut protecting region 20 has a height H3 (FIG. 2) that is at least as high as the height H1 of the nut 12. It should be noted that in the shown embodiment of the cap device 10, the nut protecting region 20 is hexagonally shaped. As a result, once the cap protecting region 20 passes over the nut 12, the cap device 10 can not be rotated independently of the nut 12. This differs significantly with many other prior art devices that use round cap protecting regions.

The second region of the cap device 10 is the bolt protecting region 22. The bolt protecting region 22 contains a cylindrical structure 24 that extends upwardly from the center of the lower nut protecting region 20. The cylindrical structure 24 is hollow, wherein the hollow of the cylindrical structure 24 communicates with the chamber defined by the nut protecting region 20. In the shown embodiment, the cylindrical structure 24 has a smooth interior surface 25 with a diameter D (FIG. 1). The interior diameter D is preferably slightly larger than the pitch diameter P of the bolt 14. Since the cylindrical structure 24 fits over the bolt 14, it will be understood that the cylindrical structure 24 must have a height H4 (FIG. 2) that is at least as high as the height H2 of the exposed bolt 14.

A locking lip 28 is disposed on the exterior of the cylindrical structure 24 proximate the top open end 18. A removable lid 30 is provided that contains a flat top surface 31 and a continuous side wall 32 that extends downwardly from the flat top surface 31. A groove 34 is defined on the interior of the continuous side wall 32. The locking lip 28 on the exterior of the cylindrical structure 24 is sized to be received within the groove 34 on the interior of the removable lid 30. When the locking lip 28 is received within the groove 34, a fluid imperious seal is created between the cylindrical structure 24 and the removable lid 30. The removable lid 30 can be a separate element or can be tethered to the cylindrical structure 24 with a tether element 27, as is shown.

The cap device 10 is filled with a non-curable protective material 38 such as petroleum grease, silicone or the some other water insoluble viscous material. Referring to FIG. 2, it can be seen that as the cap device 10 is placed over a nut 12 and bolt 14, the nut protecting region 20 passes over the nut 12, while the bolt protecting region 22 passes over the bolt 14. Since the nut protecting region 29 is hexagonally shaped, the nut protecting region 20 closely conforms to the shape of the nut 14, thereby eliminating the gaps that occur with round prior art cap devices. As the cap device 10 is advanced over the nut 12 and bolt 14, the protective material 38 present within the cap device 10 is displaced out through the open top end 18 of the cylindrical structure 24. Once the cap device 10 is fully seated, the excess protective material 38 that has been displace through the open top end 18 is removed. The removable lid 30 is then placed over the open top end 18 of the cylindrical structure 22.

Figure 3:
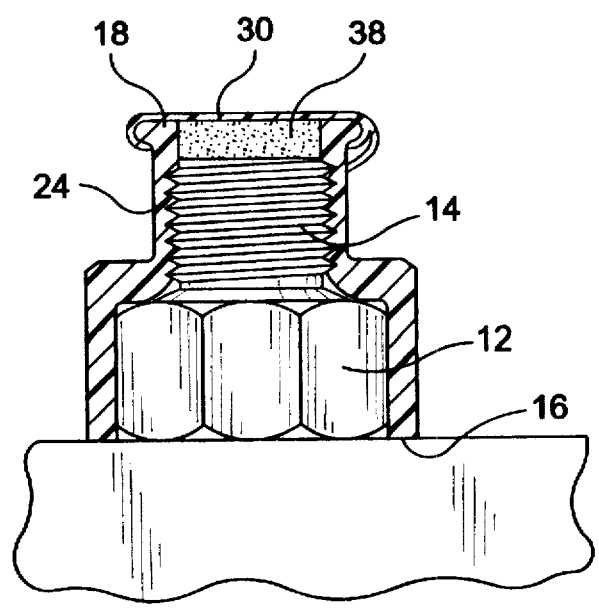
FIG. 3 is a cross-sectional view of the exemplary embodiment of the cap device set forth in FIG. 1, viewed along sectional line 2—2, wherein the cap device is shown in an closed condition.

Referring to FIG. 3, it can be seen that after the removable lid 30 is placed over the cylindrical structure 24 the remaining protective material 38 completely fills the space in between the removable lid 30 and the top of the bolt 14. Furthermore, the protective material 38 fills any gaps that may exist between the cap device 10 and the nut 12 and bolt 14 it surrounds. This creates an air impervious seal between the open bottom end 16 of the cap device 10 and the open top end 18 of the cap device 10. Since the removable lid 30 is placed over the open top end 18 of the cylindrical structure 24 only after the protective material 38 is displaced, the protective material 38 is not compressed and no high pressure condition is created within the cap device 10. Consequently, there are no forces from within the cap device 10 that act to separate the cap device 10 from the nut 12 and bolt 14. Rather, a reverse phenomenon exists. Once the removable lid 30 is set in place over the cylindrical structure 24, the top open end 18 of the cap device 10 is sealed. As a result, should the cap device 10 ever be pulled away from the nut 12 and bolt 14, areas of negative pressure would develop in the cylindrical structure 24 between the removable cap 30 and the bolt 14. Similarly, an area of negative pressure would develop in between the cap protecting region 20 of the cap device 10 and the nut 12. The development of areas of negative pressure would resist the removal of the cap device 10, even if the cap device were in an inverted position. As such, the structure of the cap device 10 acts to retain itself in position over the nut 12 and bolt 14. To remove the cap device 10, the removable lid 30 is removed from over the open top end 18 of the cylindrical structure 24. With the removable lid 30 removed, no areas of negative pressure develop within the cap device 10. As a result, the cap device 10 can be readily removed.

As has been previously stated, the cylindrical structure 24 of the cap device 10 preferably does not engage the bolt 14 with an interference fit. Since no interference fit occurs, the structure of the cap device 10 alone is sufficient to retain the cap device in place. As a result, the cap device 10 can be used in applications where the bolt 14 does not extend up significantly beyond the nut. This is quite different from some prior art cap devices that thread onto the bolt and therefore require that the bolt extend beyond the nut.

Figure 4:
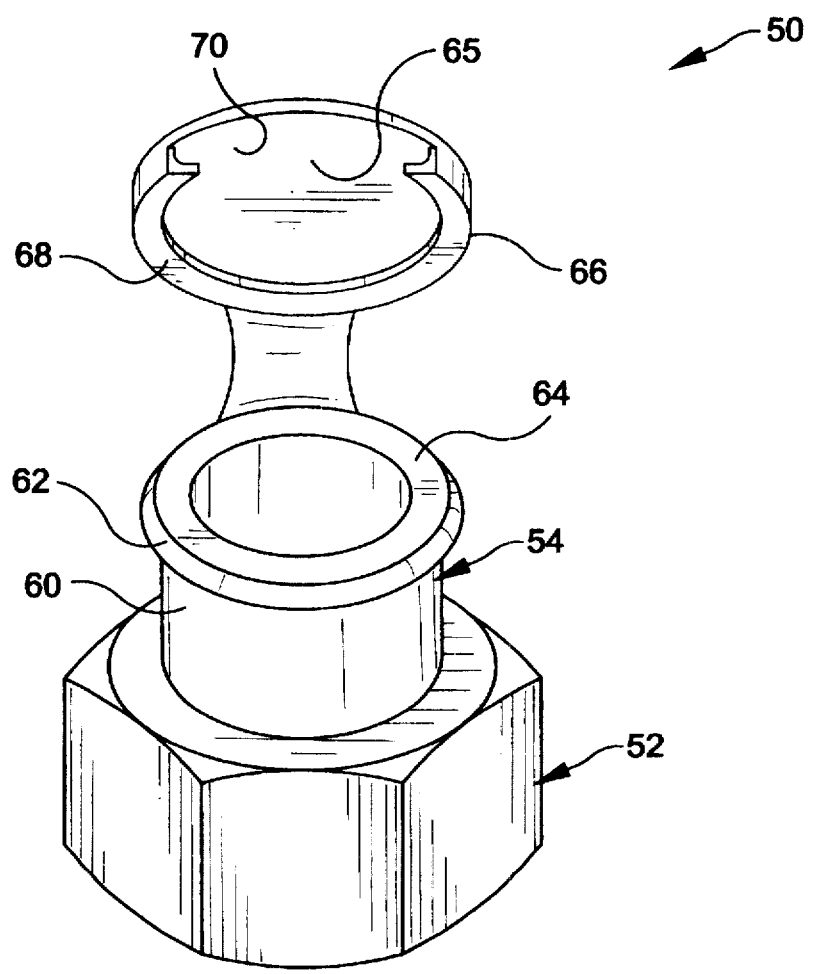
FIG. 4 is a perspective view of an alternate embodiment of a cap device in accordance with the present invention.

Referring to FIG. 4, an alternate embodiment of the present invention cap device 50 is shown. The cap device 50 has a nut protection region 52 and a bolt protection region 54 that are the same in form and function at that described in regard to FIGS. 1, 2 and 3. The bolt protection region 54 contains a cylindrical structure 60 that extends upwardly from the center of the nut protection region 52. A locking lip 62 is disposed on the exterior of the cylindrical structure 60 near the open top end 64 of the cylindrical structure 60.

The cover lid 66 is provided that engages the locking lip 62 on the cylindrical structure 60. The cover lid 66 has a planar circular top surface 65. An annular side wall 68 extends downwardly the periphery of the circular top surface 65. A slot 70 is formed in the annular side wall 68. The cover lid 66 is seated onto the cylindrical structure 60 by advancing the slot 70 in the annular side wall 68 horizontally against the cylindrical structure 60 so that the circular top surface 65 of the cover lid 66 passes over the open top end 64 of the cylindrical structure 60. The annular side wall 68 of the cover lid 66 elastically yields as the locking lip 62 passes through the slot 70. Once past the slot 70, the locking lip 70 on the cylindrical structure 60 rests within the confines of the annular side wall 68, thereby sealing the open top end 64 of the cylindrical structure 60.

As with the previous embodiment, the cap device 50 of FIGS. 4 is prefilled with a protective material (not shown). The cap device 50 is then applied to a nut and bolt assembly (not shown) with the cover lid 66 removed. After the cap device 50 is seated and the protective material displaced, the cover lid 66 is set into position. Since the cover lid 66 passes horizontally over the open top end 64 of the cylindrical structure 60, the cover lid 66 would wipe away any excess protective material that has been displaced up through the open top end 64, thereby creating the proper seal within the interior of the cap device 50.

Figure 5:
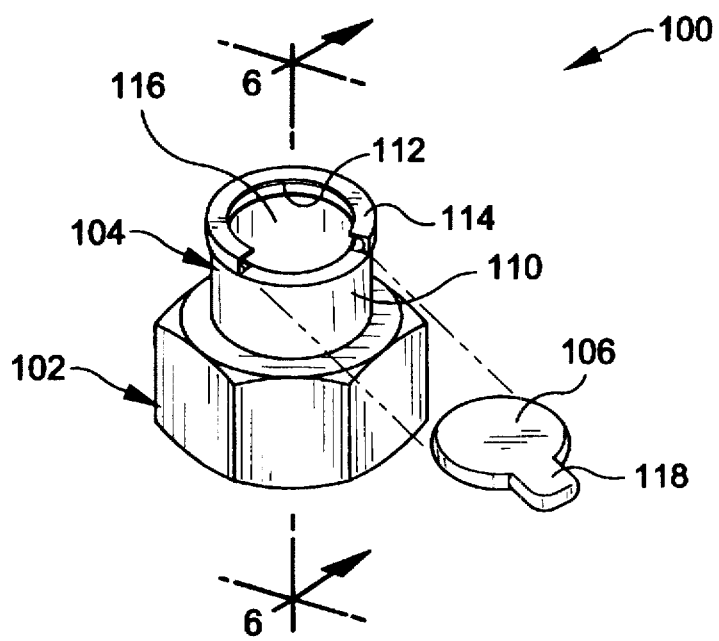
FIG. 5 is a perspective view of a second alternate embodiment of a cap device in accordance with the present invention.
Figure 6:
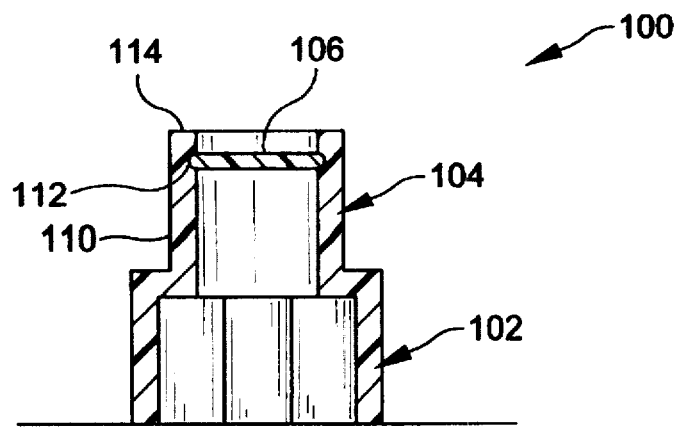
FIG. 6 is a cross-sectional view of the embodiment set forth in FIG. 5, viewed along sectional line 6—6.

Referring to FIG. 5 in conjunction with FIG. 6, an alternate embodiment of the present invention cap device 100 is shown. The cap device 100 has a nut protection region 102 that is the same in form and function at that described in regard to FIGS. 1, 2 and 3. However, the cap device 100 has a bolt protection region 104 that is different in structure from previous embodiments, wherein the bolt protection region 104 is adapted to retain an alternate form of a cover lid 106. The bolt protection region 104 contains a cylindrical structure 110 that extends upwardly from the center of the nut protection region 102. A groove 112 is disposed on the interior of the cylindrical structure 110 near the open top end 114 of the cylindrical structure 110. A slot 116 (FIG. 5) is formed in the cylindrical structure 110. The slot 116 extends from the open top end 114 of the cylindrical structure 110 to a plane that is tangential to the bottom edge of the groove 112.

The cover lid 106 is a planar circular structure having a pull tab 118 (FIG. 5) radially extending from one point. The cover lid 106 can be passed through the slot 116 in the cylindrical structure 110, wherein the cylindrical structure 110 elastically yields as the cover lid 106 passes through the slot 116. Once past the slot 116, the cover lid 106 rests within the groove 112, thereby sealing the top of the cap device 100. To remove the cover lid 106 from the cylindrical structure 110, the pull tab 118 is engaged either by hand or with a tool and the cover lid 106 is pulled out through the slot 116.

As with the previous embodiment, the cap device 100 of FIGS. 5 and 6 is prefilled with a protective material (not shown). The cap device 100 is then applied to a nut and bolt assembly (not shown) with the cover lid 106 removed. After the cap device 100 is seated and the protective material displaced, the cover lid 106 is set into position, thereby sealing the interior of the cap device 110 and retaining the cap device 100 into place.

Figure 7:
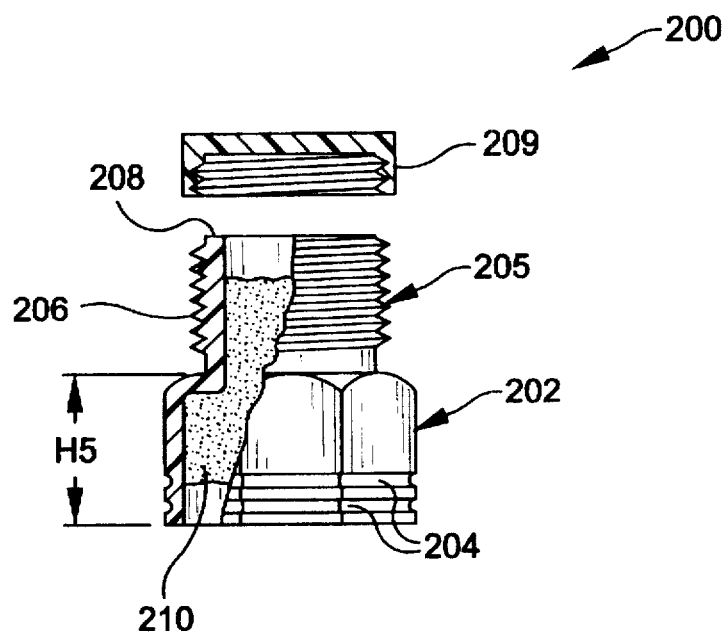
FIG. 7 is a cross-sectional view of a third alternative embodiment of a cap device in accordance with the present invention.

Referring to FIG. 7, a second alternate embodiment of a cap device 200 is shown in accordance with the present invention. In this embodiment, the nut protection region 202 contains break away grooves 204 at different levels in its exterior. The break away groves 204 enable different segments of the nut protection region 202 to be readily removed in an even fashion. Consequently, the height H5 of the nut protection region 202 can be selectively changed. This enables a single cap device 200 to be customized to more ideally fit nuts of different thicknesses.

The cap device 200 includes a bolt protection region 204 containing a cylindrical structure 206. The exterior of the cylindrical structure 206 is threaded from its open top end 208 downward a predetermined distance. A threaded lid 209 is provided that can be selectively attached to the cylindrical structure 206 over the open top end 208. When engaged with the threads on the exterior of the cylindrical structure 206, the threaded lid 209 seals the open top end 208.

The cap device 200 is filled with a protective viscous material 210. The cap device 200 is initially placed over a nut and bolt assembly (not shown) with the threaded lid 209 removed. As the cap device 200 is applied, the protective material 210 is displaced in the manner previously explained. After the cap device 200 is fully seated into place, the threaded lid 209 is applied, thereby sealing the cap device 200 and retaining the cap device 200 into place.

Figure 8:
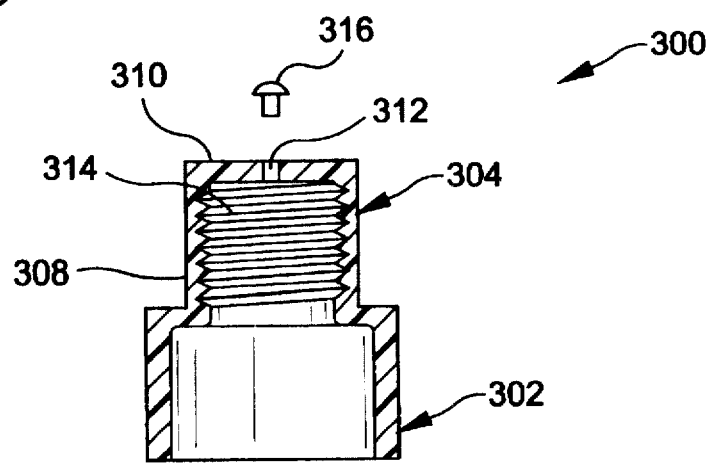
FIG. 8 is a cross-sectional view of a fourth alternative embodiment of a cap device in accordance with the present invention.

Referring to FIG. 8, a third alternate embodiment of a cap device 300 is shown in accordance with the present invention. In this embodiment, the nut protection region 302 is round rather than hexagonally shaped. As a result, when the cap device 300 is placed over a nut and bolt assembly, the cap device 300 can be rotated. The bolt protection region 304 contains a cylindrical structure 308 that extends upwardly from the nut protection region 302. The cylindrical structure 308 has one mostly closed end 310. A small aperture 312 extends through the mostly closed end 310, wherein the aperture 312 communicates with the central opening 314 defined by the cylindrical structure 308. The interior of the cylindrical structure 308 is threaded. As a result, when the cap device 300 is placed over a nut and bolt assembly, the cylindrical structure 308 can be threaded onto the threads of the bolt and retained in place.

Although not shown, the cap device 300 is filled with a protective material. As the cap device 300 is advanced over a nut and bolt assembly, the protective material is displaced through the aperture 312 at the top mostly closed end 310. One the cap device 300 is filly seated, the aperture 312 can be closed with a removable plug 316, thereby sealing the cap device 300 and helping retain the cap device 300 in place.

In each of the embodiments of the present invention cap device that have been described, the cap device has a feature that enables a viscous fill material to be displaced from the cap device as it is advanced over a nut and bolt assembly. After the fill material is displaced, the opening through which the fill exited the cap device is sealed, thereby creating a type of vapor lock that helps seat the cap device. As a result, the present invention cap device need not engage the nut and bolt assembly with threads. This enables the present invention cap device to engage nuts that do not have a bolt extending from it. Since a nut has essentially the same external shape as does a bolt's head, the present invention cap device can therefore also be applied to a bolt's head, wherein the cap device covers the bolt's head and protects it from oxidation.

It will be understood that a person skilled in the art could make alternate embodiments of the present invention using functionally equivalent components that have not been specifically described. Furthermore, it should be understood that the features shown in the various described embodiments can be interchanged to produce yet additional embodiments. All such modifications are intended to be included in the scope of this disclosure as defined by the appended claims.

What is claimed is:

1. A cap device for a nut and a segment of bolt that extends through the nut, said cap device comprising:
   a nut protecting region for covering the nut;
   a cylindrical bolt protecting region, having a predetermined diameter extending between a first end and a second end, wherein said first end is joined to said nut protecting region and said second end is fully open; and
   a closure element, separate and external of said bolt protecting region, wherein said closure element has an engagement means associated therewith for selectively engaging and sealing said second end of said bolt protecting region.

2. The device according to claim 1, further including fill material disposed within at least said bolt protecting region, wherein some of said fill material is displaced through said second end of said bolt protecting region when said cap device is advanced over the nut and bolt.

3. The device according to claim 2, wherein said fill material is a viscous water insoluble compound.

4. The device according to claim 1, wherein said nut protecting region defines a hexagonally shaped chamber having one open end, wherein said hexagonally shaped chamber is adapted to receive the nut therein through said open end.

5. The device according to claim 1, wherein bolt protecting region has a threaded exterior surface and said closure element is a lid that engages said threaded exterior surface.

6. The device according to claim 1, further including a locking lip disposed on the exterior of said bolt protecting region proximate said second end, wherein said closure element engages said locking lip when placed over said second end of said bolt protecting region.

7. The device according to claim 1, wherein said bolt protecting region has a threaded interior surface.

8. The device according to claim 1, wherein said nut protecting region has an exterior surface of a predetermined height and at least one break away slot is disposed in said exterior surface for removing a segment of said nut protecting region below said slot, thereby selectively altering said height.

9. The device according to claim 1, wherein said nut protecting region defines a circular shaped chamber having one open end, wherein said circular shaped chamber is sized to receive the nut therein through said open end.

10. A cap device for a nut and a segment of bolt that extends through the nut, said cap device comprising:
    a nut protecting region for covering the nut, said nut protecting region having an exterior surface of a predetermined height and at least one break away slot disposed in said exterior surface for removing a segment of said nut protecting region below said slot, thereby selectively altering said height;
    a bolt protecting region having a first end joined to said nut protecting region and an open second end; and
    a closure element for selectively closing said open second end of said bolt protecting region.

11. The device according to claim 10, further including fill material disposed within at least said bolt protecting region, wherein some of said fill material is displaced through said second end of said bolt protecting region when said cap device is advanced over the nut and bolt.

* * * * *